United States Patent [19]

Bukowski et al.

[11] Patent Number: 4,926,442

[45] Date of Patent: May 15, 1990

[54] CMOS SIGNAL THRESHOLD DETECTOR

[75] Inventors: Eugene R. Bukowski, South Bend, Ind.; Charles R. Hoffman, Raleigh, N.C.

[73] Assignee: International Business Machines Corporation, Armonk, N.Y.

[21] Appl. No.: 208,327

[22] Filed: Jun. 17, 1988

[51] Int. Cl.$^5$ ............................................. H04B 1/12
[52] U.S. Cl. ........................................ 375/76; 307/351
[58] Field of Search .................. 375/94, 76; 329/50, 329/146, 122; 307/261, 352, 351; 330/9, 51, 107, 7

[56] References Cited

U.S. PATENT DOCUMENTS

| | | | |
|---|---|---|---|
| 3,838,448 | 9/1974 | Garde et al. | 375/76 |
| 3,947,769 | 3/1976 | Rousos et al. | 375/76 |
| 4,523,107 | 6/1985 | Peterson | 330/107 |
| 4,631,737 | 12/1986 | Davis et al. | 375/76 |

Primary Examiner—Robert L. Griffin
Assistant Examiner—Marianne Huseman
Attorney, Agent, or Firm—Joscelyn G. Cockburn

[57] ABSTRACT

An improved CMOS signal magnitude detector (SMD) for accurately quantifying the peak-to-peak magnitude of a received signal is disclosed. The SMD includes a precision gain amplifier, positive and negative peak detectors and a switched capacitive amplifier. The recited components are coupled to form a combination circuit arrangement which receives a differential signal and outputs a single ended signal which is compared with a reference signal to provide a control signal when the differential signal is of a sufficient peak to peak voltage magnitude. The control signal may be used to gate the differential signal and generate an output signal representative of received data.

13 Claims, 6 Drawing Sheets

CMOS SIGNAL THRESHOLD DETECTOR

BACKGROUND OF THE INVENTION

1. Field of the Invention

The present invention relates to signal magnitude detectors in general and more particularly to signal magnitude detectors implemented in data acquisition signal systems using CMOS technology.

2. Prior Art

The use of circuit arrangements for recovering information from a communications channel is well known in the prior art. Even though the prior art circuit arrangements may differ in implementation details, the general approach is that the circuits set a threshold level for an incoming signal. If the incoming signal exceeds the threshold level, it is characterized as data. Incoming signals that do not exceed the threshold level are characterized as noise.

Prior art circuit arrangements which vary from the above design technique include the following patents:

U.S. Pat. No. 3,760,282. The subject patent describes a circuit arrangement which logically combines output signals from one or more threshold detectors and one or more peak detectors to form an output signal representative of received data.

U.S. Pat. No. 4,219,152 describes a circuit arrangement for reading bar codes imprinted on UPC labels. The circuit arrangement comprises of a comparative amplifier which compares an analog signal representative of a bar code pattern and an adjusted threshold signal generated from a slope detector, a negative peak detector and a positive peak detector.

U.S. Pat. No. 3,893,180 uses negative and positive threshold detectors for measuring the strength of prerecorded servo tracks on a disc and uses the information to position a magnetic head relative to a track on the disc.

U.S. Pat. No. 4,030,040 describes a circuit arrangement which selects the most desired signal from similar signals provided by two or more radio receivers. The circuit arrangement includes a log amplifier connected in series with an absolute value filter. A pair of peak and valley detectors are connected in parallel. The absolute valley filter is connected to the inputs of the detectors and the output of the detectors is connected to an operational amplifier arranged in a standard subtract configuration.

Even though the above circuits work well for their respective purposes, they have certain shortcomings which make them unsuitable for use in certain environments or be implemented with certain technologies. Among the shortcomings is the fact that the above circuit arrangements are implemented in bipolar technology. This technology is well known and is best suited for fabricating either digital or analog circuit modules. However, the increasing demand for VLSI circuits makes it necessary to integrate both analog and digital circuits on the same chip. A review of prior art literature indicates that CMOS is the technology of choices for fabricating modules which include both digital and analog circuits.

Even though CMOS is the preferred technology for fabricating mixed modules (i.e., a module which includes both digital and analog circuitries), there are certain problems which must be recognized and overcome before the CMOS process can be used efficiently. Because the above-described prior art fails to recognize these problems and have implemented the respective circuits in bipolar technology suggests that the prior art circuits are not intended to be used in VLSI chips with mixed circuits. In addition, the type of components used in the above prior art circuits further suggest that fabricating them with the CMOS process would not be economical.

One of the problems which must be overcome in using CMOS technology to fabricate analog and digital circuits on a common substrate is that only a single power supply level, usually +5 v, is available. The digital circuits are either "ON" or "OFF" and as a result requires only a single voltage supply. However, analog circuits must be operated in their linear region where circuit nodes are biased at voltage levels, in this case, between the power supply level and common ground. Therefore, an a.c. ground somewhere between the power supply level and common ground must be provided. Optimally, this a.c. ground is Vdd/2 (Vdd being the single voltage supply). However, since Vdd has a tolerance associated with its value, this a.c. ground is no longer a stable reference. Even so, it is still a common reference if it can be accurately reproduced throughout the system. Hence, the first problem was providing such a reference that is also insensitive to CMOS process variations.

Another problem occurs when the mixed module has to recover signals within the millivolt range. Such small signals are not uncommon in communications channels such as LANs (Local Area Networks), etc. Incidentally, such small signals cannot be recovered by the above described prior art circuits because they are well below the threshold levels which would activate their operation.

The problem which these small signals create for the CMOS implementation is that inaccuracies caused by mismatched devices can be a relatively high percentage of the signal magnitude to be recovered. For example, published data has shown that thresholds mismatched between source coupled pairs of FET devices alone are in the order of tens of millivolts. Source coupled paired FET devices are required in differential amplifiers, operational amplifiers, comparators, etc. In addition, published reports also show that some CMOS processes may have a ±15 mv margin. If the total signal magnitude of the signal to be recovered is 50 mv, then a mismatch of ±15 mv is a significant part of the total signal magnitude (approximately 30%).

Still another CMOS technology problem concerns common mode shifting. Common mode shifting is the variation in the common or d.c. component of a time varying signal. Such variations can be caused by variations in a.c. ground (i.e., variations in power supply), component mismatch, or a signal that is not always symmetrical around a.c. ground. All of the above are possible occurrences in the described system. Special techniques were therefore developed to quantify signals that experience common mode shifting.

A common system problem which affects not only the CMOS designed system but also the prior art bipolar designed system is the inability to track or recover a signal having variable magnitude.

Peak detectors are often used to quantify the voltage magnitude of a received signal. Peak detectors are linear circuits that continuously store the maximum or the minimum peak voltage level of a time varying signal. If the time varying signal is very small in magnitude, then the design of the peak detector can be optimized for low signal levels. However, there are systems that produce predominantly low signal levels with high level components. For example, the data signal received by adapters from some types of LANs (such as the LAN described by the 802.2 and 802.5 IEEE Standard Committee) can be very small in magnitude depending on the system characteristics. It is possible that the protocol data, which appears before and after the main data, can consist of information which is transmitted at one-half the frequency of the main data. For example, delimiter bits are transmitted at one-half the frequency of the main data. Since data transmitted at lower frequencies has more energy than data transmitted at higher frequencies within the same system, the former would not be attenuated as much as the latter. Hence, signal components very large in magnitude can be present in the midst of the low signal levels at the receiving end of the described system. If a peak detector is optimally designed for low signal levels, then the presence of such high level components can effectively mask the signal of interest. In other words, given the described system, a conventional peak detector would store the voltage level provided by the high level components regardless of the low signal levels.

This last problem concerns that of converting a differentially (double ended) quantified value to a single ended one. The peak detected signal magnitude in the disclosed subsystem is a differential value between two voltage levels. This presents a problem because this differential value must be compared to a single ended reference value. Therefore, a technique for converting the peak detected signal magnitude from double ended to single ended is required.

SUMMARY OF THE INVENTION

It is therefore the general object of the present invention to provide a circuit arrangement which recovers relatively small signals and can be implemented with CMOS technology.

The circuit arrangement is comprised of a signal magnitude detector which includes a differential precision gain amplifier, a positive or maximum peak detector, a minimum or negative peak detector and a switched capacitor amplifier. The signal magnitude detector processes an incoming signal stream and that outputs a signal that is compared first with a referenced signal to generate a control signal which gates the incoming signal to provide a signal representative of incoming data. If the signal magnitude within the incoming signal stream falls below a desired range, the control signal is deactivated and the incoming signal is discarded.

The foregoing and other objects and advantages of this invention will be more fully described in the accompanying drawings.

DETAILED DESCRIPTION OF THE PREFERRED EMBODIMENT

Even though the present invention to be described hereinafter may be used in different types of systems, it works well in recovering data from a communications network and, as such, will be described in that environment. However, this should not be construed as a limitation on the scope of the invention since it is well within the skill of one skilled in the art to use the invention as described or with minimum modification to work in any of a plurality of systems.

Figure 1:
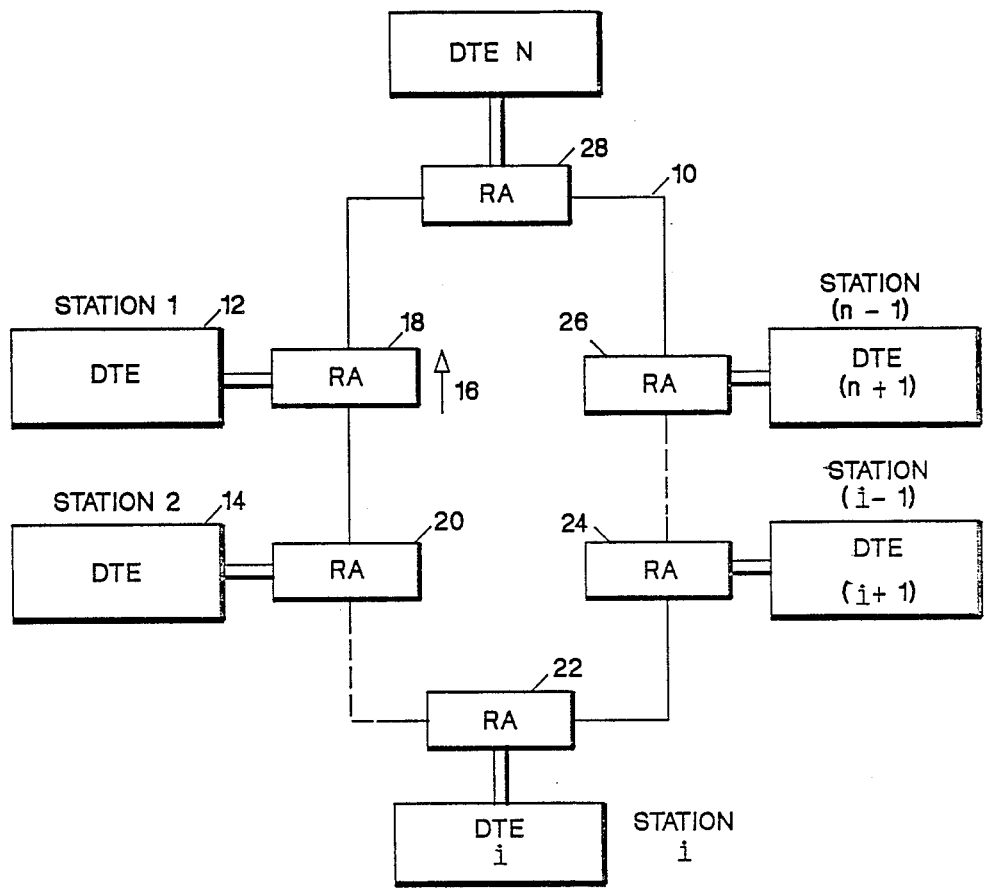
FIG. 1 shows a block diagram of a communications network in which the teachings of the present invention are used.

FIG. 1 is a block diagram of a ring communications system in which the present invention may be used. The serial ring communications system includes a closed loop unidirectional transmission ring identified by numeral 10. The ring interconnects a plurality of data terminal equipment (DTE) or data terminal units (DTU) 12, 14, ... i, i+1, ... n+1 and n. Each data terminal unit may include one or several devices such as display terminals, microcomputers, data collectors, file servers and telephone type apparatus. The function of the system is to exchange or distribute data between these devices. Data transmission in the system is unidirectional and may be in the direction shown by arrow 16. The data terminal equipments are connected to the ring by ring adapters (RA) 18, 20, 22, 24, 26 and 28. The function and structure of the ring adapters are identical. The function of the ring adapters is to receive data from and transmit data onto the ring. To this end, the ring adapter performs ring protocol functions which enable the free movement of data on the ring without impacting the design of the data terminal equipment which is connected to the adapter. The protocol which the present communications system follows is set forth in the IEEE 802.5 standard for local area networks and is incorporated herein by reference. A more detailed description of the communications system of FIG. 1 is set forth in U.S. Pat. No. 4,507,777 which is incorporated herein by reference.

Preferably, the ring adapters are integrated on a single chip and the data recovery subsystem which forms the present invention is fabricated on the adapter.

Figure 2:
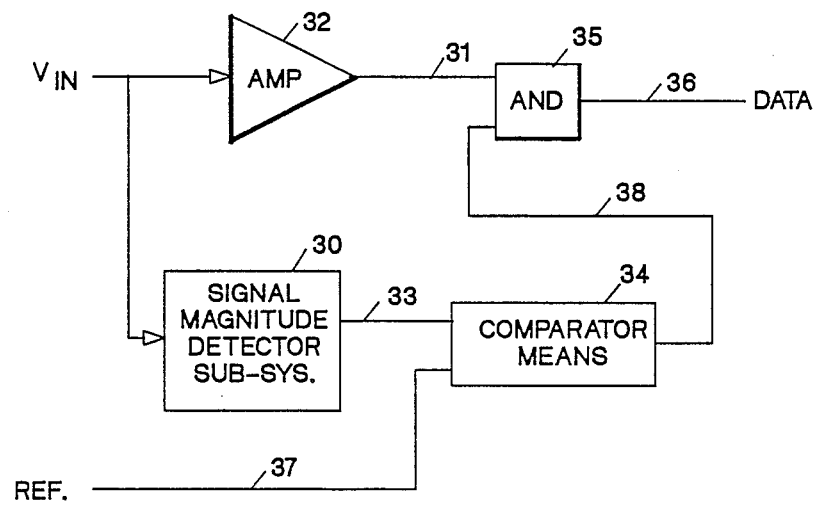
FIG. 2 shows a circuit arrangement for recovering information signals from the communications network of FIG. 1.

FIG. 2 shows a block diagram of a data recovery system which recovers informational signals from the communications medium 10 (FIG. 1) and outputs a data signal representative of the data on conductor 36. The data recovery system includes a signal magnitude detector subsystem 30, a conventional high gain power amplifier 32, a conventional comparator means 34, and a logical AND circuit means 35. $V_{IN}$ represents the input voltage signal from communications media 10 which is simultaneously coupled by appropriate conductors to amplifier 32 and signal magnitude detector subsystem 30. Conventional amplifier 32 amplifies $V_{IN}$ and sends it via conductor 31 to the AND circuit means. The signal magnitude detector subsystem quantizes (that is, measures) the peak-to-peak amplitude of the signal $V_{IN}$. If the quantized value of the signal falls within the range set by signal magnitude detector subsystem 30, a signal is outputted on conductor 33 and is fed into comparator means 34. A reference signal which may be generated from any conventional means including the threshold voltage of a P-channel enhancement mode device is fed over conductor 37 into comparator means 34. When the signal on conductor 33 exceeds the reference signal on conductor 37, comparator means 34 outputs a control signal on conductor 38. The signal on conductor 38 indicates that valuable data is on communications media 10 and is used to gate the output from amplifier 32 to output the data signal on conductor 36.

Figure 3:
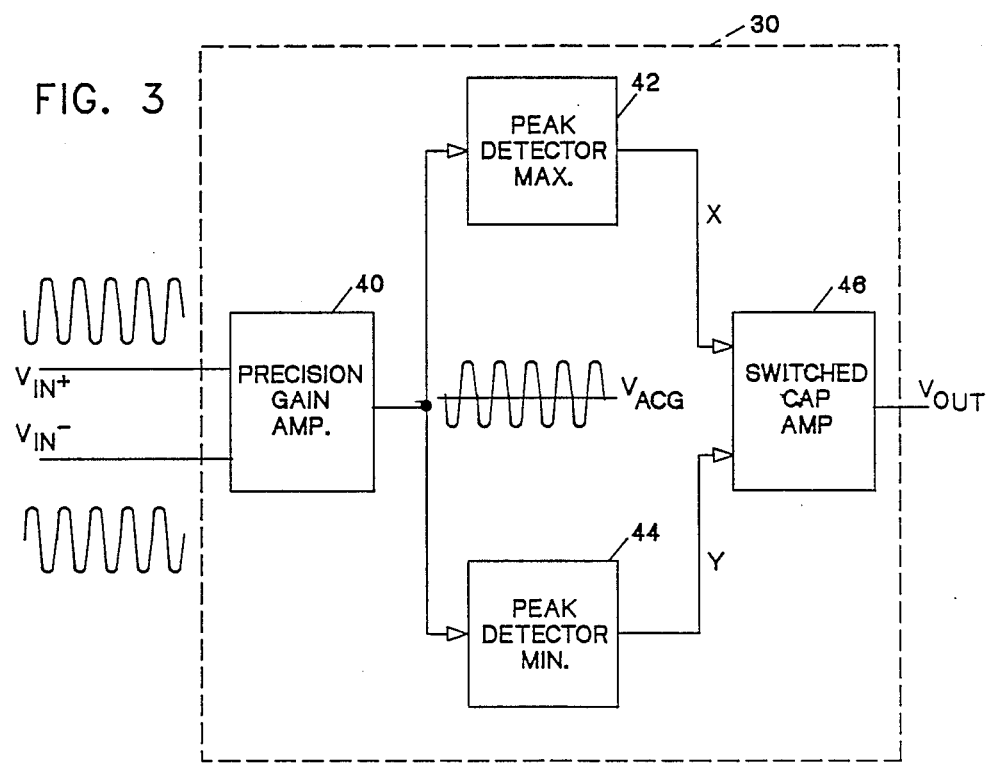
FIG. 3 shows a block diagram of a signal magnitude subsystem.

FIG. 3 shows a block diagram for signal magnitude detector subsystem 30. As stated above, the signal magnitude detector subsystem monitors incoming signals and when the peak-to-peak amplitude of the signal falls within a predetermined range, generates a control signal Vout which is used for gating the incoming signal $V_{IN}$ (FIG. 2). To this end, the signal magnitude detector subsystem establishes a d.c. reference voltage ($V_{ACG}$) about which the maximum and minimum peaks of $V_{IN}$ swing and are measured by maximum and minimum peak detectors, adjust (preferably, remove) common mode signal components from $V_{IN}$ and amplifies the small signal by a precision amount in order to overcome error conditions which are inherent in circuit parameters and the CMOS fabricating process.

Still referring to FIG. 3, the signal magnitude detector subsystem 30 includes precision gain amplifier means 40, a positive or maximum level peak detector 42, a negative or minimum level peak detector 44 and a switched capacitor amplifier means 46. As can be seen from FIG. 3, both the negative and positive portions of the incoming signal $V_n$ are used. Also, the respective graphical sketches are a representation of the incoming signal pulses as they progress through the signal magnitude detector subsystem. For example, the incoming signal $V_{IN}$ is sinusoidal. The precision gain amplifier 40 performs the functions described above on the sinusoidal input signal and outputs a single-ended signal which swings about the reference base line $V_{ACG}$.

Peak detector 42 captures the positive peaks of $V_{IN}$ and outputs the signal X while the negative peaks of $V_{IN}$ is captured by peak detector 44 and is outputted as Y. The switched capacitive amplifier 46 combines X and Y algebraically and outputs the control signal Vout. It should also be noted that the precision gain amplifier is so constructed that common mode signals $V_{cm}$ which are common to $V_{IN}$ are adjusted or extracted from the signal which is outputted from the signal magnitude detector. The electrical circuitry for each of the function blocks in FIG. 3 will now be described.

Figure 4:
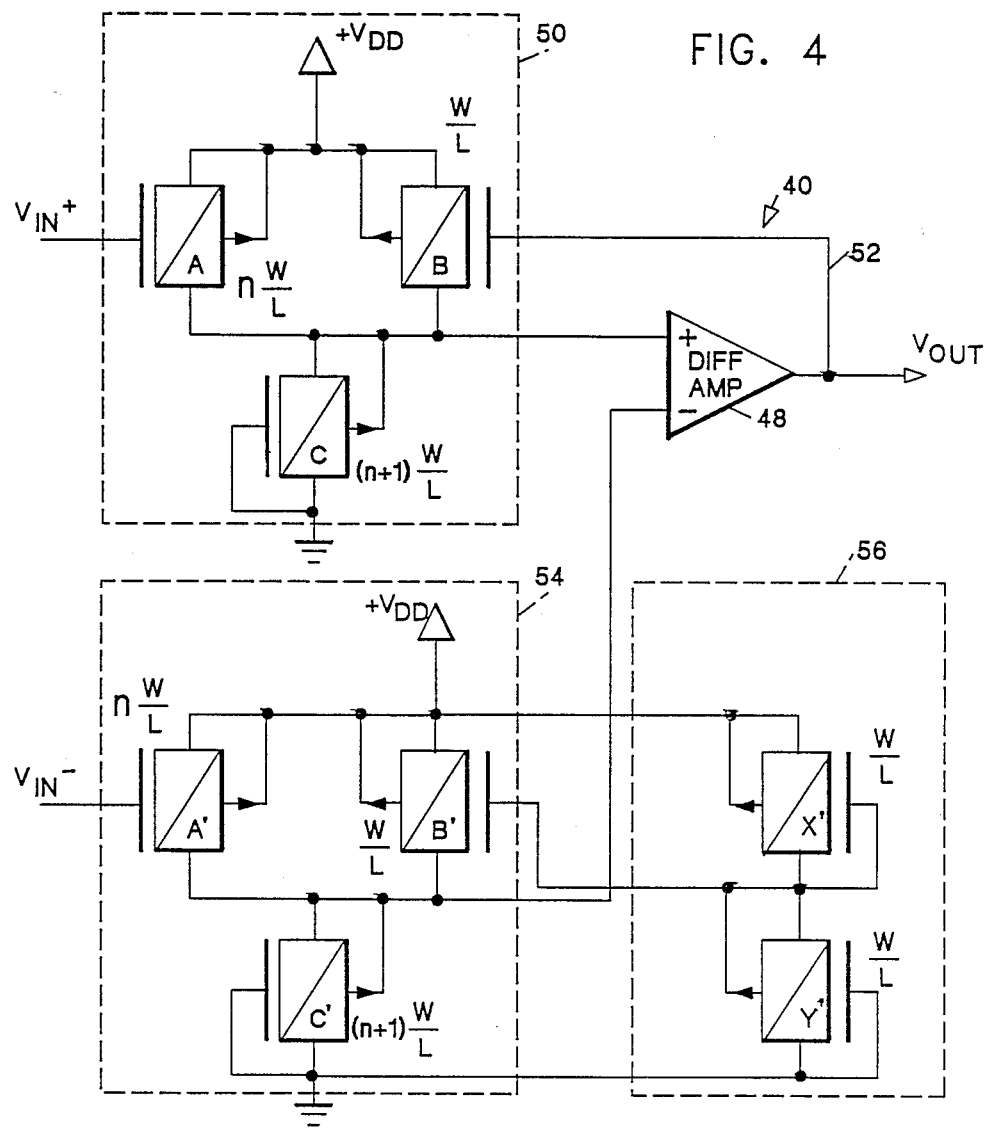
FIG. 4 shows a circuit diagram for the differential precision gain amplifier.

FIG. 4 shows a circuit diagram for precision gain amplifier means 40 (FIG. 3). Preferably, the amplifier is a differential precision gain amplifier fabricated with CMOS technology. The differential precision gain amplifier is comprised of conventional differential amplifier 48. This conventional amplifier can be of the type described in the literature and as such details will not be given. The differential amplifier has an output Vout and an inverting and non-inverting input terminals. The positive portion ($V_{IN}+$) of incoming signals is coupled through gain setting means 50 to the positive terminal of the differential amplifier. A conductor 52 interconnects the gain setting means 50 to the output terminal (Vo).

Similarly, the negative portion ($V_{IN}-$) of input signal $V_{IN}$ is coupled through a gain setting means 54 to the negative terminal of differential amplifier 48. Both gain setting means 50 and 54 are coupled between positive power supply rail ($+V_{dd}$) and a reference potential such as ground. Also, both gain setting means are identical. Reference setting voltage means 56 is coupled to gain setting means 54. As described previously, reference voltage setting means 56 sets the base line reference ($V_{ACG}$) about which $V_{IN}$ swings.

Still referring to FIG. 4, since the gain setting means are identical, only one will be described in detail, it being understood that the other gain setting means has identical components and function in the identical manner as the one which has been described. Each of the transistors used in FIG. 4 is P-channel enhancement mode transistors. Of course, N-channel devices may be used without deviating from the scope and teaching of the present invention. Each of the P-channel enhancement mode devices is a 4-terminal device in which the substrate terminals are identified with arrows. Gain setting means 50 is comprised of P-channel FET devices A, B and C. Devices A and B are positioned in parallel and are in series with device C. The prime notations are used to distinguish the components in gain setting means 54. As stated above, these gain setting means are identical. The substrate and source electrodes of each of the devices are connected together. Regarding devices A and B, their respective source and substrate electrodes are further connected to supply voltage rail $V_{dd}$. The drain electrodes of device A and device B are connected to the source and substrate electrode of device C. The drain electrode of device C is tied to its gate electrode and to a reference potential. The gate electrode of device A is connected to $V_{IN+}$. The gate electrode of device B is connected by conductor 52 to $V_{out}$.

Still referring to FIG. 4, the reference voltage setting means 56 is comprised of series-connected P-channel FET devices X' and Y', respectively. The devices are connected in series by their respective drain and source electrodes. The substrate electrode of device X' is connected to its source electrode. The gate electrode of device X' is connected to its drain. Similarly, the substrate electrode of device Y' is connected to its source and its gate electrode is connected to its drain. The relationship between the width to length (W/L) ratio of the respective devices is shown on FIG. 4. The gain is set by the width to length ratio of the respective devices. As can be seen from the figure, $$\text{gain} = \frac{(W/L)_a}{(W/L)_b}$$

a represents device A and b represents device B. Also, the width to length ratios of (A+B)/C=the W/L ratio of X/Y.

The circuit of FIG. 4 provides precision gain, minimizes the impact of common mode signals and input offset voltage. Even though source coupled pair of said voltage is still present, this offset voltage is a constant no matter what the gain setting of the precision amplifier. If the gain setting is high, then this offset becomes less significant compared to the amplified signal. The gain setting of the precision amplifier is further maximized by using the full magnitude of the received differential signal. In FIG. 4 the gain setting of the precision amplifier is a 10 times gain. Therefore, a 15 mv mismatch is only 3% of the total amplified signal amplitude of a 500 mv signal.

Figure 5:
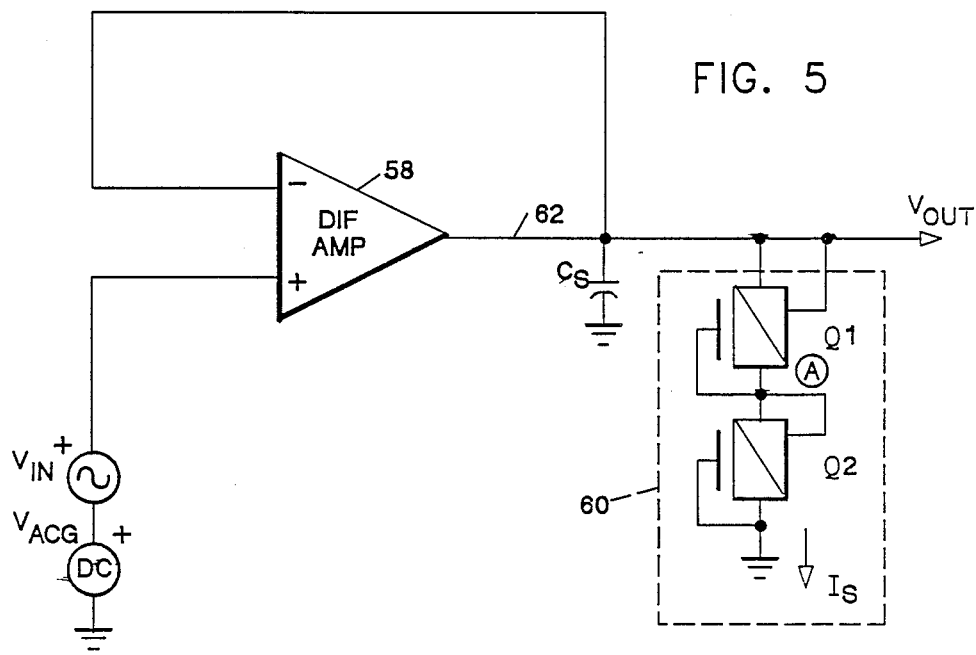
FIG. 5 shows a circuit schematic for the maximum peak detector.
Figure 6:
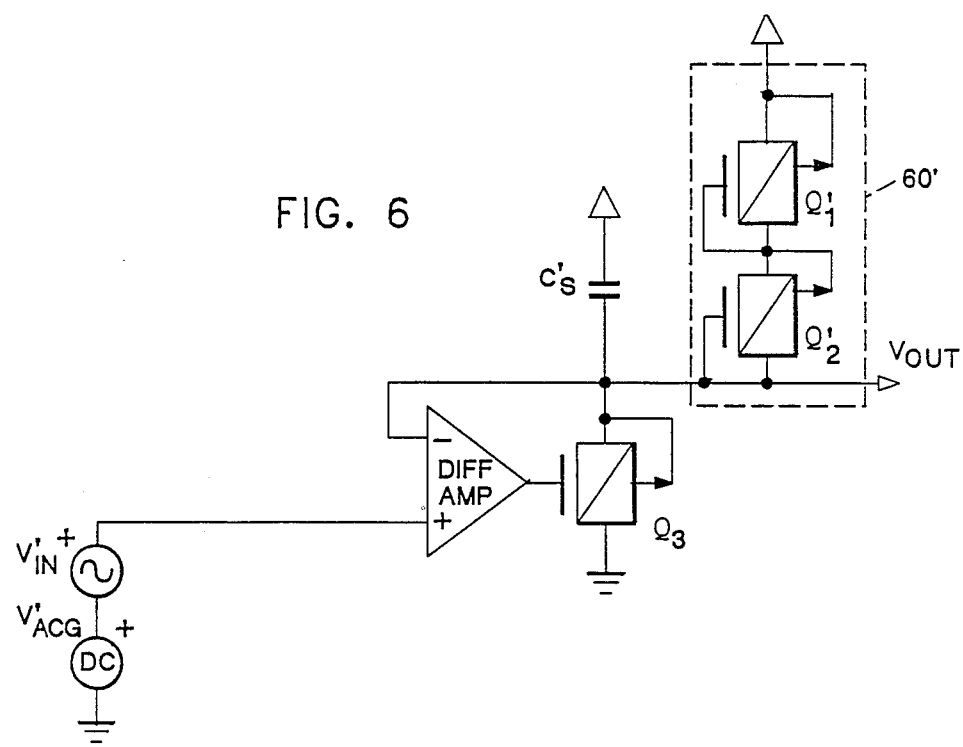
FIG. 6 shows a circuit schematic for a minimum peak detector.

FIGS. 5 and 6 show details of peak detectors 42 and 44 which are used to accurately quantify the peak to peak voltage magnitude of the precision amplified signal. Since the output of the precision gain amplifier is single-ended, both a maximum (positive) peak detector and a minimum (negative) peak detector are required. By using both maximum and minimum peak detectors, common mode shifting due to signal asymmetry about a.c. ground does not affect the accuracy of the peak detected signal magnitude. Also, the difference between the two peak detected voltage levels will always accurately quantify the signal magnitude regardless of their absolute voltage values.

With reference to FIG. 5, the maximum peak detector is comprised of differential amplifier 58, storage capacitor $C_s$ and circuit arrangement 60. The storage capacitor is coupled by conductor 62 to the output state of the differential amplifier. The output signal from the precision gain amplifier is coupled to the positive terminal of the differential amplifier. The signal is shown schematically in FIG. 5 as an a.c. signal $V_{IN}$ imposed on a d.c. signal $V_{ACG}$. Conductor 62 is coupled through storage capacitor $C_s$ to a reference voltage level. Preferably, the voltage reference level is a ground potential. Circuit arrangement 60 is connected in parallel to storage capacitor $C_s$. Circuit arrangement 60 is coupled between conductor 62 and the reference ground potential (ground). The function of circuit arrangement 60 is to provide a variable rate of discharge for storage capacitor $C_s$. Due to this function, whenever a high valued positive voltage peak is stored on capacitor $C_s$, the rate of current discharge through circuit arrangement 60 is relatively high. Likewise, when the voltage value stored on capacitors is relatively low, the rate of discharge through circuit arrangement 60 is also low. Stated another way, the rate of current discharge through circuit arrangement 60 varies in accordance with the magnitude storage charge on capacitor $C_s$. As a result of this unique characteristic of circuit arrangement 60, any high signal level which is presented in the incoming signal is rejected.

Figure 5A:
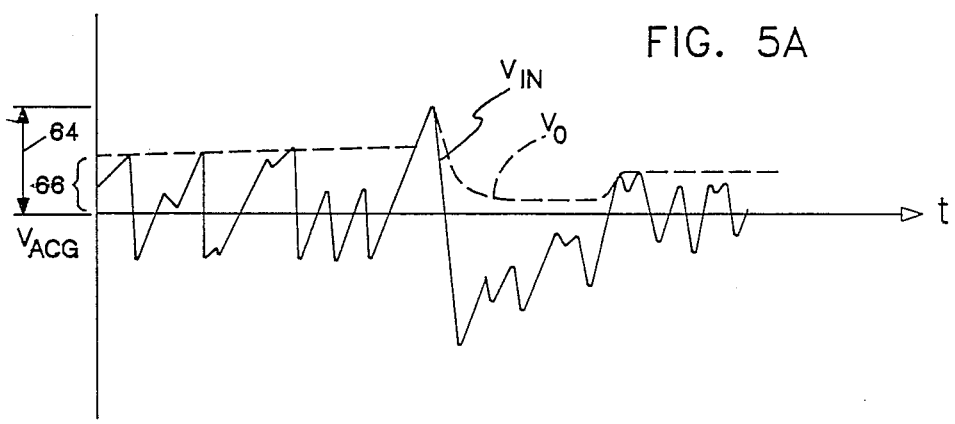
FIG. 5A shows a graphical schematic of the signal generated by the peak detector.

Turning to FIG. 5A for the moment, a graphical representation of the high signal level rejection feature of the present invention is shown. As discussed above, the incoming signal from the communications channel has high level components and a low level component. The graph identified as $V_{IN}$ represents the incoming signal while the graph represented by $V_o$ represents the output signal from positive peak detector 42. Numeral 64 represents the high level component of the incoming signal while numeral 66 represents the low level component. By designing circuit arrangement 60 with the variable discharge characteristic, the high frequency component 4 does not unduly influence the output signal $V_o$. As is used in this application, the high signal level 64 is rejected by the circuit.

Referring again to FIG. 5, in the preferred embodiment of the invention circuit arrangement 60 includes P-channel enhancement mode devices Q1 and Q2 connected in series by their respective drain and source electrodes to form node A between both devices. The gate electrode of each device is connected to its drain electrode and the substrate electrode of each device is connected to the source electrode. A mathematical analysis of the variable discharge characteristics of circuit arrangement 60 will now be given.

As discussed above, the incoming signal is generally relatively small, say within the millivolt range. This dictates that the peak detecting circuitry has to be optimized for low signal levels. However, due to the characteristics of the incoming signal, certain fields or sections of the signals include high level components such as 64 (FIG. 5A). To compensate for these high level components, high signal level rejection must be included in the circuit. Preferably, transistors Q1 and Q2 are isolated in their own N-wells and each N-well (bulk) terminal is shorted (biased) to its respective transistor source terminal. With this configuration the threshold voltages of both transistors Q1 and Q2 are equal and are equal to the base threshold voltage of P-channel transistors. Also, the gates of both transistors Q1 and Q2 are shorted (biased) to their respective drain terminals. Therefore, Q1 and Q2 always operate in their saturation regions. The current equation for Q1 and Q2 can be approximated as follows:

$$Isd_{Q1} = k(W/L)_{Q1}(Vo - Va - Vto)^2 \quad (1)$$

$$Isd_{Q2} = k(W/L)(Va - Vto)^2 \quad (2)$$

where k represents process dependent constants, W is the width of the device, L is the length of the device, and Vto is the base threshold voltage for P-channel transistors. By summing the currents at node A, one finds $$Isd_{Q1} = Isd_{Q2} \quad (3)$$

Equations (1), (2) and (3) give $$\frac{(W/L)_{Q1}}{(W/L)_{Q2}} = \frac{(Va - Vto)^2}{(Vo - Va - Vto)^2} \quad (4)$$

It should be noted that the expression in equation (4) becomes unity for Va=Vo/2. Hence, if the ratio of equation (4) is intentionally designed to be unity, then the current through transistors Q1 and Q2 (Is) can be described as:

$$Is = k(W/L)(Vo/2 - Vto)^2. \quad (5)$$

Equation (5) reveals that the discharge current, Is, is a function of the square of the output voltage Vo. For signals with very small peak to peak voltage levels, Vo is approximately equal to VACG (i.e., Vdd/2). Depending on the size of the storage capacitor, $C_s$ the discharge current Is can be designed to be negligible, in this case, by designing transistors Q1 and Q2 to be long and narrow devices. Now if a high level component appears in the midst of the low level signal and Vo becomes large, then the discharge current, Is, also becomes very large by the square of Vo. Therefore, the peak detector can quickly recover from the high signal level component. In other words, as is used in this application, high signal levels are ignored or rejected.

Figure 6A:
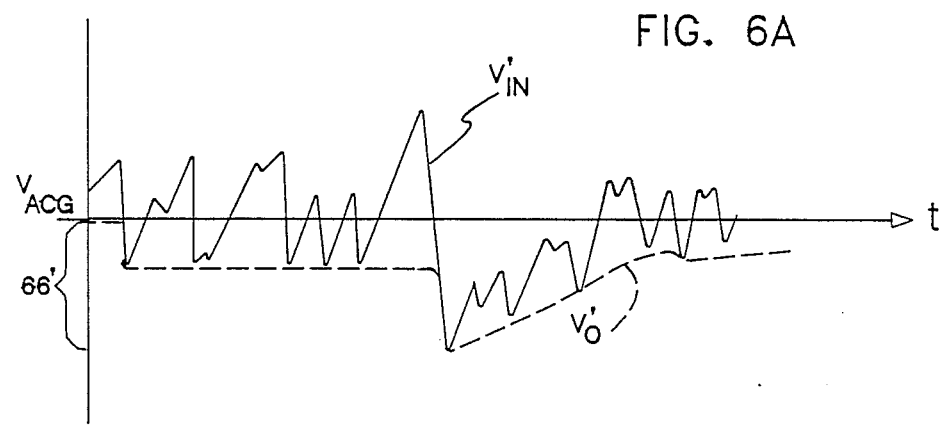
FIG. 6A shows a graphical schematic of the signal generated by the peak detector.

FIG. 6 shows a circuit schematic of the negative peak detector 44 (FIG. 3) which detects the negative peak of the incoming signal. FIG. 6A shows a graphical representation of the incoming and output signals shown as $V_{IN}'$, $V_o'$ with circuit arrangement 60' rejecting a negative high component 66' of the incoming signal. The minimum peak detector shown in FIGS. 6 and 6A function identically as its positive complement previously described relative to FIGS. 5A and 5. Since these circuits are substantially the same and are complement of each other, common numerals are used to identify elements which are the same in the respective figures. However, in order to distinguish the elements in FIGS. 5 and 5A from elements in FIGS. 6 and 6A, the elements in FIGS. 6 and 6A are identified with prime notation. However, their operation and function are identical and for brevity, since these functional characteristics have already been described, only elements in FIG. 6 that are not present in FIG. 5 will be described.

Figure 8:
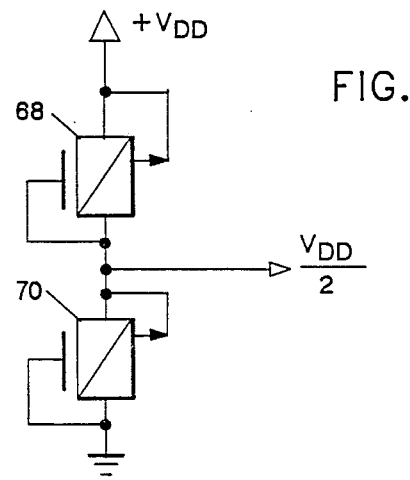
FIG. 8 shows an a.c. ground generator for use in a single supply system.

In FIG. 6 device Q3 is an output stage of the differential amplifier. The substrate electrode of Q3 is tied to its source while the gate electrode is tied to an output stage of the differential amplifier and a drain electrode is coupled to ground potential. Also, capacitor Cs' and device Q1' are tied to a reference potential above ground. Although this reference potential may have different values and be designed in a plurality of different ways, in the preferred embodiment of this invention, FIG. 8 shows a preferred configuration for generating a biasing voltage with a value $V_{dd/2}$. This biasing voltage is generated by connecting two identical P-channel transistors 68 and 70 in series between Vdd and common ground. Preferably, each transistor has its own isolated N-well (bulk or substrate). Each N-well or substrate terminal is connected to its respective transistors source terminal and each transistor gate terminal is connected to its respective drain terminal.

It should be noted that even though two transistors are used in FIGS. 5 and 6 for discharging the storage capacitor, the mathematical model used to establish that the capacitor is discharged at the variable rate is also valid for a single discharge transistor. One of the cost reduction characteristics of the CMOS technology is that it operates with a single power supply level. Therefore, the optimum a.c. ground level is one-half the single power supply level (value Vdd/2). If only a single discharge transistor were used in place of the two disclosed here, the size that would be required to make the nominal discharge current negligible would be very large. This is due to the presence of large overdrive voltage. By using two transistors, as disclosed here, this overdrive is greatly reduced.

It should also be noted that transistors Q1 and Q2 (FIG. 5) and Q1', Q2' (FIG. 6) do not necessarily require separate N-wells. As long as the maximum sum of their threshold voltages is always less than the minimum possible a.c. ground level, they would not require separate wells. However, the variations in threshold voltage due to the body effect of the variations in the a.c. ground level due to power supply tolerances may suggest that placing the transistors in separate N-wells may be desirable.

Figure 7:
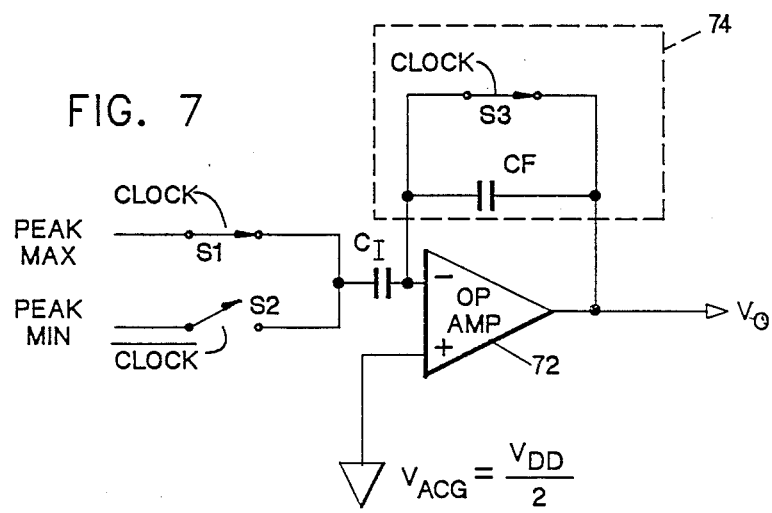
FIG. 7 shows a circuit diagram of the switched capacitor amplifier.

FIG. 7 shows a circuit diagram for switched capacitive amplifier 46 (FIG. 3). Switched capacitive amplifier 46 converts differential quantified signal magnitudes identified as P max and P min to a single-ended voltage level (Vo) reference to a.c. ground, i.e. Vdd/2. Vdd/2 is provided by the circuit arrangement of FIG. 8.

Still referring to FIG. 7, the switched capacitive amplifier includes operational amplifier 72, a circuit arrangement 74, input capacitor $C_I$ switch (S1) and switch (S2). Circuit arrangement 74 forms a feedback loop which interconnects the output of op amp 72 to its inverted input terminal. Switch S3 and capacitor Cf are arranged in parallel in the negative feedback loop of operational amplifier 72.

By using negative feedback, the high gain of the amplifier forces the voltage levels at its inputs to be equal values (Vdd/2). When a controlling clock signal (not shown) is high, the output of the amplifier is shorted to its negative input terminal and therefore the voltage level at the output is also Vdd/2. This implies that there is no charge in the feedback capacitor Cf. In addition, the charge that resides on the input capacitor Ci is the difference between the voltage at VH (in this case, the maximum peak detector level) and Vdd/2. When the clock signal switches low ($\overline{\text{clock}}$), the charge that now resides in the input capacitor CI becomes the difference between the voltage at Vdd/2 and the voltage at VL (in this case, the minimum peak detected level). Therefore, an excess charge is created in the circuit that correlates to the difference between VH and VL. With no place else to go, this charge must redistribute itself on the feedback capacitor Cf. This then gives the following equation for the output voltage:

$$VO = (Vdd/2) + (CI/CF)(VH - VL) \qquad (6)$$

It should be noted that the switched capacitive amplifier not only converts the differential quantified signal magnitude to a single-ended voltage level reference to a.c. ground, but it can also amplify this value by the ratio of the capacitance as well. Since the ratios of MOS capacitors can be very precise, this amplification can also be very precise. In other words, the gain of the switched capacitive amplifier can be set precisely. This makes the overall subsystem very flexible because it does not restrict the threshold or reference value to which the quantified signal magnitude is to be compared.

The above-described circuit provides a signal magnitude detector for recovering signal within millivolt range from a communications channel. Problems concerning a.c. ground biasing with a single power supply, source coupled pair of offset voltages, common mode shifting, and the precise conversion of a differentially quantified value to a single-ended one have all been addressed and solved. Also, a simple method to add high signal level rejection to CMOS peak detectors has also been disclosed.

While the invention has been particularly shown and described with reference to the preferred embodiment thereof, it will be understood by those skilled in the art that various changes in form and details may be made therein without departing from the spirit and scope of the invention:

1. A data recovery system comprising:
   first means for providing an input signal;
   an amplifier means for receiving and processing the signal; said processing including adjusting any common mode components associated in said signal, setting a reference baseline about which positive peaks and negative peaks of said signal are being measured and amplifying said signal;
   a maximum peak detecting means for detecting and storing first signal charges representative of the positive peaks of said input signal;
   a first circuit means coupled to said maximum peak detecting means, said first circuit means discharging said maximum peak detecting means at a rate which varies in accordance with the magnitude of the first signal charges;

a minimum peak detecting means for detecting and storing second signal charges representative of the minimum peaks of said input signal;

a second circuit means discharging said minimum peak detecting means at a rate which varies in accordance with the magnitude of said second signal charges; and a switched capacitive amplifier means for combining signals generated from the maximum and minimum peak detecting means and outputting an amplified signal-ended signal.

2. The data recovery system of claim 1 further including a second means for providing a reference signal; and a comparator means for comparing the reference signal and the single-ended signal and generating a control signal when the single-ended signal exceeds the reference signal.

3. A data recovery system comprising:

first means for providing an input signal;

an amplifier means for receiving and processing the signal; said processing including adjusting any common mode components associated in said signal, setting a reference baseline about which positive peaks and negative peaks of said signal are being measured and amplifying said signal;

a maximum peak detecting means for detecting the positive peaks;

a minimum peak detecting means for detecting the negative peaks;

a switched capacitive amplifier means for combining signals generated from the maximum and minimum peak detecting means and outputting an amplified single-ended signal;

a second means for providing a reference signal;

a comparator means for comparing the reference signal and the single-ended signal and generating a control signal when the single-ended signal exceeds the reference signal; and a third circuit means for receiving the control signal and the input signal, and for outputting a signal representative of the data.

4. The data recovery system of claim 1 wherein the amplifier means includes a differential precision gain amplifier.

5. A data recovery system comprising:

first means for providing an input signal;

a differential precision again amplifier means for receiving and processing the signal; said processing including adjusting any common mode components associated in said signal, setting a reference baseline about which positive peaks and negative peaks of said signal are being measured and amplifying said signal;

said differential precision gain amplifier means including a differential amplifier having a positive input, a negative input and an output;

a second means for setting a desired gain coupled to the positive terminal;

a conductor interconnecting the output to the second means;

a third means for setting a desired gain coupled to the negative terminal; and a fourth means for establishing a voltage reference baseline for said incoming signal coupled to the negative terminal of said differential amplifier;

a maximum peak detecting means for detecting the positive peaks;

a minimum peak detecting means for detecting the negative peaks; and a switched capacitive amplifier means for combining signals generated from the maximum and minimum peak detecting means and outputting an amplified single-ended signal.

6. The data recovery system of claim 5 wherein the second and third means include a first P-channel FET device having a drain electrode, a source electrode and a substrate electrode with the source electrode connected to the substrate electrode;

a second P-channel FET device connected in parallel to the first P-channel FET device; said second P-channel FET device having a drain electrode, a substrate and source electrode connected to the substrate and source electrode of said first P-channel FET device; and a third P-channel FET device connected in series with the first and second P-channel FET device.

7. The data recovery system of claim 5 wherein the fourth means includes a pair of P-channel FET device connected in series with respective drain and source electrodes and each device having its gate and drain electrodes connected to a first node and its source and substrate electrodes connected to a second node.

8. A data recovery system comprising:

first means for providing an input signal;

an amplifier means for receiving and processing the signal; said processing including adjusting any common mode components associated in said signal, setting a reference baseline about which positive peaks and negative peaks of said signal are being measured and amplifying said signal;

a maximum peak detecting means for detecting the positive peaks; said maximum peak detecting means including a differential amplifier having a positive input, a negative input and an output;

a conductor means interconnecting the negative terminal to the output;

a conductor means interconnecting the positive terminal to a first reference level;

a storage means;

a circuit means connected in parallel with the storage means and operable for discharging the storage means at a rate that is proportional to the charge thereon;

a minimum peak detecting means for detecting the negative peaks; and a switched capacitive amplifier means for combining signals generated from the maximum and minimum peak detecting means and outputting an amplified single-ended signal.

9. The data recovery system of claim 8 wherein the storage means is a capacitor.

10. The data recovery system of claim 9 wherein the circuit means includes two series connected P-channel transistors.

11. A data recovery system comprising:

first means for providing an input signal;

an amplifier means for receiving and processing the signal; said processing including adjusting any common node components associated in said signal, setting a reference baseline about which positive peaks and negative peaks of said signal are being measured and amplifying said signal;

a maximum peak detecting means for detecting the positive peaks;

a minimum peak detecting means for detecting the negative peaks;

said minimum peak detecting means including a differential amplifier having a positive input terminal, a negative input terminal and an output;

a conductor means interconnecting the positive terminal to a first reference level;

a P-channel FET device coupled to the output of the differential amplifier;

a storage means coupled to the P-channel FET; and a discharge circuit means coupled in parallel with the storage means and operable for discharging the storage means at a rate proportional to the charge thereon; and a switched capacitive amplifier means for combining signals generated from the maximum and minimum peak detecting means and outputting an amplified single-ended signal.

12. A data recovery system for recovering data from a LAN comprising:

a signal magnitude detector subsystem means for receiving a data signal from said LAN, for adjusting all common mode components associated with said data signal for measuring the maximum peaks and minimum peaks of signals referenced to a baseline set at center of said data signal and to output a first signal representative of the difference between the maximum and minimum peaks of said data signal;

a comparator means for comparing a reference signal and the first signal to generate a control signal; and an amplifier means for receiving the data signal and outputting an amplified data signal; and a logical "AND" circuit for combining the amplified data signal and the control signal and to output a second signal representative of data.

13. An improved peak-to-peak detector for quantifying a signal received from a data channel comprising in combination:

a differential precision gain circuit arrangement for receiving and amplifying the signal;

a maximum peak detector circuit arrangement coupled to the differential precision gain amplifier;

a first means coupled to the maximum peak detector for discharging the peak detector at a variable rate thereby rejecting high level components of the signal;

a minimum peak detector coupled in parallel with the maximum peak detector and in series with the differential precision gain circuit;

a second means coupled to the minimum peak detector for discharging at a variable rate the peak detector thereby rejecting low level components of the signal; and a switched capacitor amplifier coupled to the maximum and minimum peak detectors; said switched capacitor amplifier converting signals outputted from the maximum and minimum peak detectors into a single-ended signal;

* * * * *